Patented July 5, 1949

2,474,824

UNITED STATES PATENT OFFICE 2,474,824

ACRIDINE COMPOUNDS AND PROCESS OF MAKING SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application November 19, 1945, Serial No. 629,713

14 Claims. (Cl. 260—279)

This invention relates to certain new and useful acridine compounds and methods for obtaining the same. More particularly, the invention relates to acridine compounds having the formula,

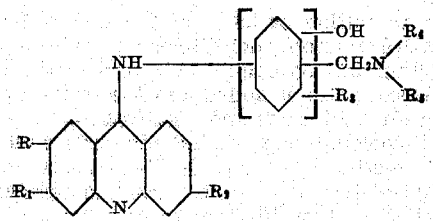

where R is hydrogen, lower alkoxy or lower alkyl, $R_1$ is hydrogen, lower alkoxy or lower alkyl, $R_2$ is hydrogen, halogen or —CN, $R_3$ is hydrogen, halogen, lower alkyl, or lower alkenyl, $R_4$ is hydrogen or an alkyl radical containing 5 to 10 carbon atoms inclusive and $R_5$ is an alkyl radical containing 5 to 10 carbon atoms inclusive.

These new compounds are useful therapeutic agents and, in general, they are characterized by their toxicity to plasmodia. These compounds may be used either in the form of their bases or their salts with organic or inorganic acids such as hydrochloric acid, sulfuric acid, phosphoric acid, sulfamic acid, acetic acid, lactic acid, tartaric acid, gluconic acid, citric acid and alkyl sulfonic acids or as the insoluble salt of methylene disalicylic acid.

The compounds of the present invention may be prepared by the reaction of a substituted aminophenol of the formula,

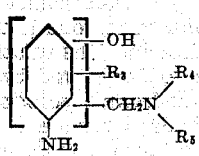

with a 9-halo or a 9-aryloxyacridine compound of the formula,

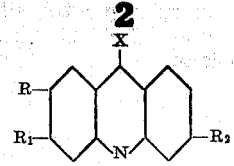

where R, $R_1$, $R_2$, $R_3$, $R_4$ and $R_5$ have the same significance as given above and X is a chlorine or bromine atom or an aryloxy radical.

The reaction may be carried out by reacting approximately equimolar quantities of the two reactants in a suitable solvent. Such solvents are, in general, water, water-miscible organic solvents and mixtures of water and water-miscible organic solvents. Some of the water-miscible organic solvents which we may use are low molecular alcohols, such as methanol, ethanol and n-propanol, low molecular weight ketones such as actone and methyl ethyl ketone and ethers such as dioxane and ethylene glycol monoethyl ether.

We prefer to carry out the above reaction of the 9-haloacridine compound and the substituted aminophenol in the presence of an acidic catalyst. Such catalysts are dilute and concentrated organic acids, phenols and dilute inorganic acids. The inorganic acids which we use are, in general, mineral acids such as hydrochloric, hydrobromic, sulfuric, phosphoric and the like acids. Some of the organic acids which we may use are acetic, propionic, butyric and the like acids. When the reaction is carried out in the presence of a concentrated organic acid or a phenol, the acid or phenol serves both as the catalyst and as the solvent. Some of the phenols which we employ to effect the reaction are phenol, o-cresol, p-cresol, m-cresol, mixed cresols and the like. When a phenol is used as the solvent and catalyst the 9-halo acridine compound probably reacts with the solvent to form the corresponding intermediate 9-aryloxy acridine compound which then reacts with the substituted aminophenol. Equally satisfactory results may be obtained when using a phenol as a solvent by starting with the 9-aryloxyacridine compound and the substituted aminophenol. The transformations involved are represented by the following equations.

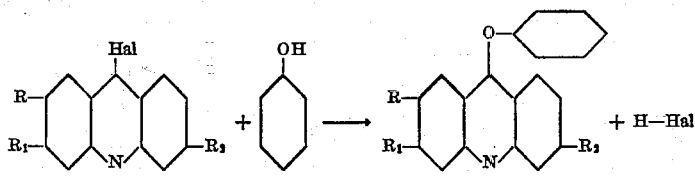

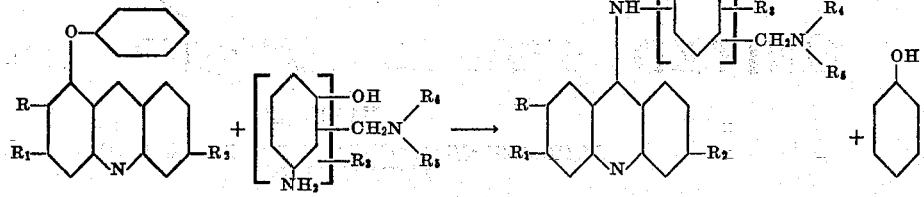

where R, R₁, R₂, R₃, R₄ and R₅ have the same significance as given above and Hal represents a chlorine or bromine atom.

A modification of our process for obtaining these new compounds involves the use of an N-acyl derivative of the substituted aminophenol. In this modification the acyl derivative is hydrolyzed to the aromatic amine under acidic conditions and the amine so formed caused to react simultaneously or subsequently with the 9-haloacridine compound. This is illustrated by the following equations.

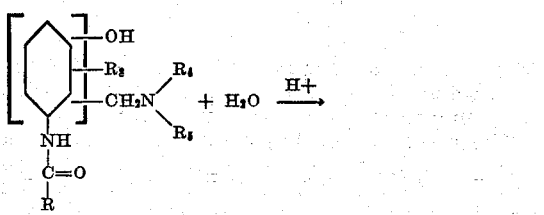

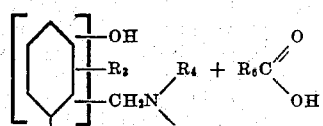

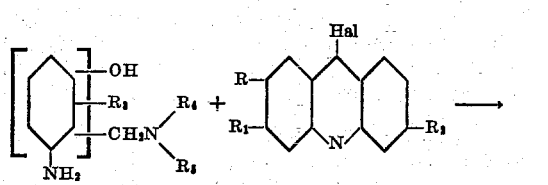

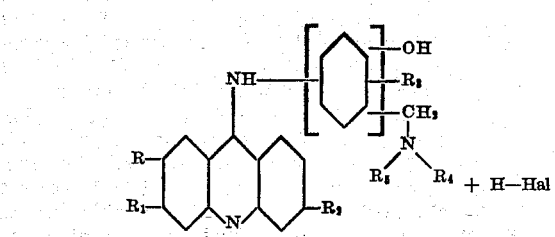

where R, R₁, R₂, R₃, R₄, R₅ and Hal have the same significance as given above and R₆ is a lower alkyl or an aryl radical.

The invention is illustrated by the following examples.

*Example 1.—2-methoxy-6-chloro-9-(3'-di-n-hexylaminomethyl-4'-hydroxyanilino) acridine*

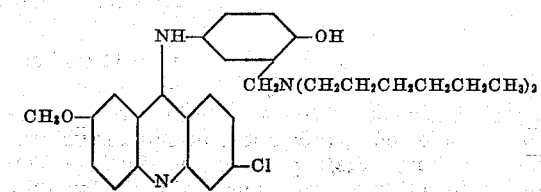

To a solution of 20 g. of 2-di-n-hexylaminomethyl-4-aminophenol dihydrobromide dissolved in 200 ml. of isopropanol 11 g. of 2-methoxy-6,9-dichloroacridine is added and the resultant mixture refluxed for one and a half hours. The solution is cooled, the crystalline dihydrobromide salt of 2 - methoxy-6-chloro-9-(3'-di-n-hexylaminomethyl-4'-hydroxyanilino) acridine removed by filtration and purified by recrystallization from methanol-acetone mixture.

By using an equivalent amount of 2-di-n-hexylaminomethyl-4-aminophenol dihydrochloride instead of the dihydrobromide salt in this procedure, one obtains 2-methoxy-6-chloro-9-(3'-di-n-hexylaminomethyl-4'-hydroxyanilino) acridine dihydrochloride.

*Example 2.—2-methoxy-6-chloro-9-(3'-di-n-octylaminomethyl-4'-hydroxyanilino) acridine*

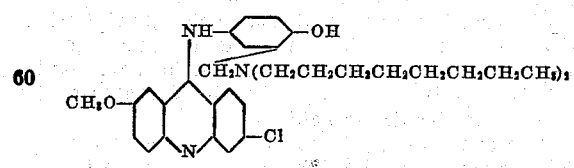

40 g. of 2-di-n-octylaminomethyl-4-acetylaminophenol is refluxed for one hour with 75 cc. of 6 N hydrochloric acid. The solution is cooled and made just acid to Congo red by the addition of dilute sodium hydroxide solution. 27 g. of 2-methoxy-6,9-dichloroacridine is added and the mixture refluxed for one and a half hours, cooled and the crude dihydrochloride of the product which separates removed and purified by recrystallization from methanol.

*Example 3.—2-methoxy-6-chloro-9-(3'-n-hexyl-aminomethyl-4'-hydroxyanilino) acridine*

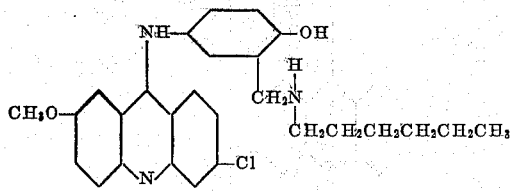

A solution consisting of 26.5 g. of 2-n-hexylaminomethyl-4-acetylaminophenol in 25 c. of concentrated hydrochloric acid is refluxed for one hour, cooled and the pH of the solution adjusted to about 4 by the addition of dilute sodium hydroxide solution. 27.5 g. of 2-methoxy-6,9-dichloroacridine and 50 cc. of ethanol are added and the mixture refluxed for one and a half hours. The mixture is cooled, the crude dihydrochloride of the product collected and purified by recrystallization from methanol.

*Example 4.—2,3 - dimethoxy - 9 - (3'-di-n-hexyl-aminomethyl - 5'- chloro - 6' - hydroxyanilino) acridine*

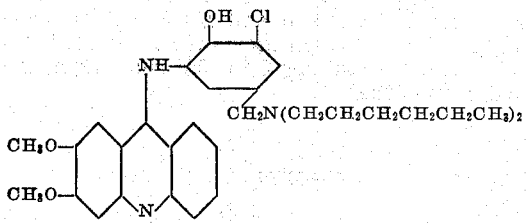

38.2 g. of 2-chloro-4-di-n-hexylaminomethyl-6-acetylaminophenol is heated with 75 cc. of 6 N hydrochloric acid for one hour, the solution cooled and the pH adjusted to about 4 by the addition of 40% sodium hydroxide solution. 27 g. of 2,3-dimethoxy-9-chloroacridine and 75 cc. of 95% ethanol are added and the mixture refluxed for one and a half hours. The mixture is cooled, made alkaline with dilute sodium hydroxide solution and extracted with ether. The combined ether extracts are dried and the ether distilled to obtain the free base of 2,3-dimethoxy-9-(3'-di-n-hexylaminomethyl-5'-chloro-6'-hydroxyanilino) acridine. The base may be purified by recrystallization from ethanol or it may be converted to the dihydrochloride salt and purified in this manner. The base is taken up in an excess of alcoholic hydrogen chloride and the dihydrochloride precipitated by the addition of acetone. The crude dihydrochloride which separates is collected and purified by recrystallization from methanol-acetone mixture.

*Example 5.—9-(3'hydroxy-4'-di-n-heptylamino-methylanilino) acridine*

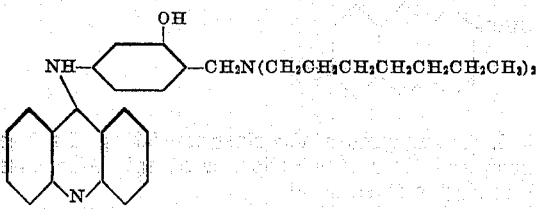

25.5 g. of 9-bromoacridine is dissolved in 100 g. of phenol by heating at 100° C. for thirty minutes. The solution is cooled and 33.4 g. of 2 - di - n - heptylaminomethyl - 5 - aminophenol added. The resulting mixture is heated at 100° C. for three hours with stirring, cooled and diluted with about one liter of water. The mixture is made alkaline with dilute sodium hydroxide solution and extracted with ether. The ether extracts are washed with 5% sodium hydroxide solution, then with water and dried. The ether is evaporated to obtain the yellow free base of 9-(3' - hydroxy - 4' - di - n - heptylaminomethyl-anilino) acridine. The product may be purified by recrystallization from isopropanol or isopropanol-ligroin mixture.

*Example 6.—2,3-dimethyl-6-bromo-9-(3'-di-n-amylaminomethyl - 4' - hydroxy - 6' - methyl - anilino) acridine*

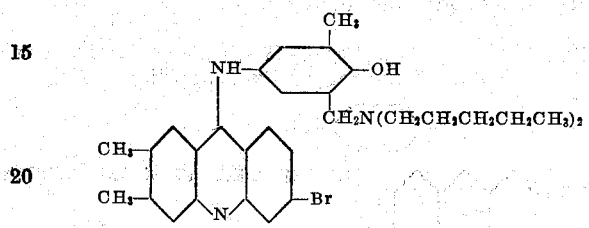

A mixture consisting of 36.5 g. of 2-di-n-amyl-aminomethyl-4-amino-6-methylphenol dihydrochloride and 32 g. of 2,3-dimethyl-6-bromo-9-chloroacridine in 300 cc. of absolute ethanol is refluxed for two hours, cooled and the crude dihydrochloride of the product collected. The crude product is purified by recrystallization from methanol.

*Example 7.—2 - methoxy -6 - cyano -9 - (3' - di - n - octylaminomethyl-4'-hydroxyanilino) acridine*

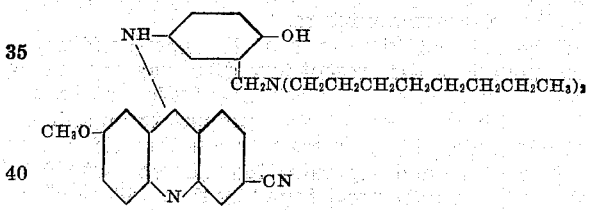

A mixture consisting of 22.5 g. of 2-methoxy-6-cyano-9-phenoxyacridine and 36.2 g. of 2-di-n-octylaminomethyl-4-aminophenol in 100 g. of phenol is heated and stirred for two hours at 110° C. The mixture is cooled, treated with about one liter of anhydrous ether and dry hydrogen chloride gas passed into the solution. The crude dihydrochloride salt of 2-methoxy-6-cyano-9-(3'-di-n-octylaminomethyl-4'-hydroxyanilino) acridine which separates is collected and purified by recrystallization from methanol-acetone mixture.

*Example 8.—2-methoxy-6-bromo-9-(3'-n-heptylaminomethyl - 4' - hydroxy - 5' - allylanilino) acridine*

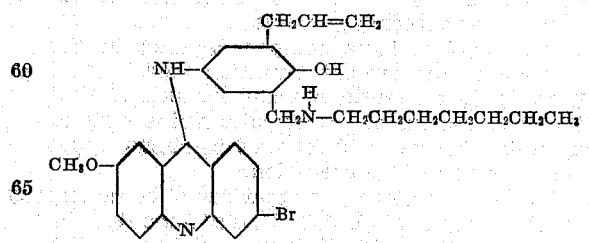

31.8 g. of 2-n-heptylaminomethyl-4-acetyl-amino-6-allylphenol is refluxed in 50 cc. of concentrated hydrochloric acid for one hour. The solution is cooled and made just acid to Congo red by the addition of sodium hydroxide solution. 32 g. of 2-methoxy-6-bromo-9-chloro-acridine is added, the mixture refluxed for one and a half hours, cooled and diluted to a volume of 500 cc. with water. The mixture is made just alkaline with dilute sodium hydroxide solution and extracted with chloroform. The chloroform extracts are washed, dried and the chloroform distilled. The gummy residue consists of the free base of 2-methoxy-6-bromo-9-(3'-n-heptyl-aminomethyl-4'-hydroxy-5'-allylanilino) acridine. The crude product may be purified by dissolving it in absolute ethanol and adding an excess of alcoholic hydrogen chloride solution. The dihydrochloride salt is precipitated by the addition of acetone, collected and purified by recrystallization from methanol-acetone mixture.

*Example 9.—2-methyl-9-(3'-di-n-decylamino-methyl-4'-hydroxyanilino) acridine*

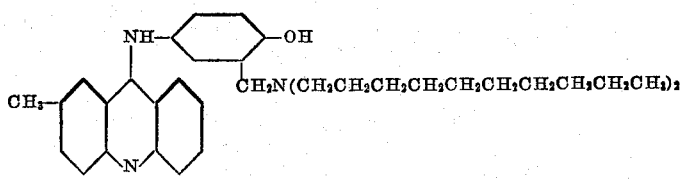

A solution of 48.5 g. of 2-di-n-decylamino-methyl-4-acetylaminophenol in 75 cc. of 4 N hydrochloric acid is refluxed for one hour, cooled and made just acid to Congo red by the addition of dilute sodium hydroxide solution. 22.7 g. of 2-methyl-9-chloroacridine is added, the mixture refluxed for one and a half hours and then cooled. The crude dihydrochloride of the product is collected and purified by recrystallization from methanol-acetone mixture.

The acid addition salts of the new acridine compounds of the present invention may be prepared by treating an alcoholic solution of the base with an excess of the appropriate organic or inorganic acid. In most instances the acid addition compound separates immediately but, if desired, it may be precipitated by the addition of acetone or ether. These salts may, in general, be purified by recrystallization from methanol, ethanol or methanol-acetone mixture.

The substituted acylaminophenols used as starting materials are usually prepared from the corresponding acylamino-phenols as described in German Patent No. 92,309. The substituted acylaminophenols can be hydrolyzed to the corresponding substituted aminophenols by means of mineral acid or alkali. The meta substituted aminophenols may, as well as the above ortho and para derivatives, be prepared by the catalytic or nascent hydrogen reduction of the corresponding substituted nitrophenols which can be prepared by the Mannich reaction or by the reaction of the chloro or bromo-methylnitrophenols with a primary or secondary amine.

The 9-haloacridine compounds used in the practice of the present invention may be prepared in the conventional manner which involves the condensation of an aromatic amine with an ortho halobenzoic acid followed by simultaneous ring closure and halogenation.

Attention is directed to applicants' copending applications Serial No. 539,990, filed June 12, 1944, now Patent No. 2,428,355, issued October 17, 1947, and Serial No. 571,961, filed January 8, 1945, wherein certain acridine compounds somewhat related to the compounds of the instant application are described and claimed.

What we claim as our invention is:

1. A compound of the class consisting of a free base and its acid addition salts, said free base having the formula,

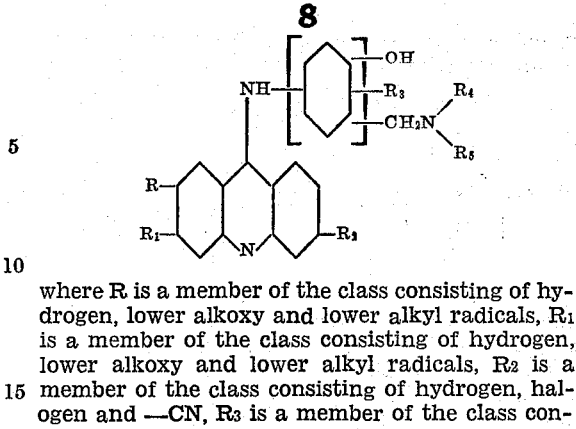

where R is a member of the class consisting of hydrogen, lower alkoxy and lower alkyl radicals, $R_1$ is a member of the class consisting of hydrogen, lower alkoxy and lower alkyl radicals, $R_2$ is a member of the class consisting of hydrogen, halogen and —CN, $R_3$ is a member of the class consisting of hydrogen, halogen, lower alkyl, and lower alkenyl radicals, $R_4$ is a member of the class consisting of hydrogen and alkyl radicals containing 5 to 10 carbon atoms inclusive, $R_5$ is an alkyl radical containing 5 to 10 carbon atoms inclusive, and the

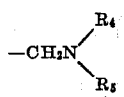

group is in one of the positions ortho and para to the —OH group.

2. A compound of the class consisting of a free base and its acid addition salts, said free base having the formula,

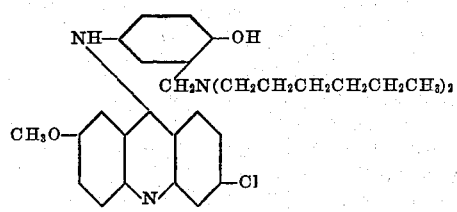

3. A compound of the class consisting of a free base and its acid addition salts, said free base having the formula,

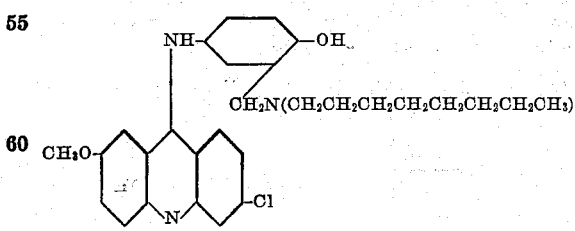

4. A compound of the class consisting of a free base and its acid addition salts, said free base having the formula,

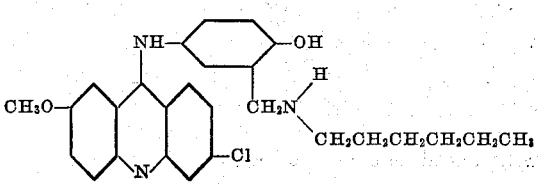

5. A compound of the formula,

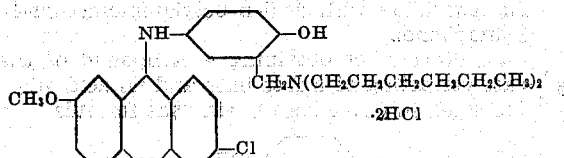

6. A compound of the formula,

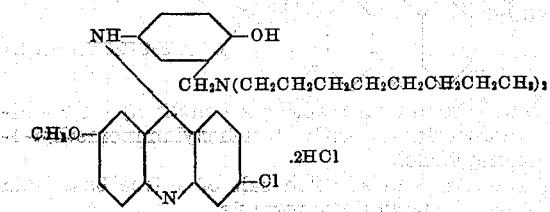

7. A compound of the formula,

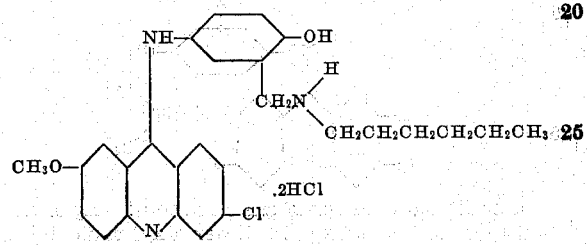

8. Process for obtaining a compound of the class consisting of a free base and its acid addition salts, said free base having the formula,

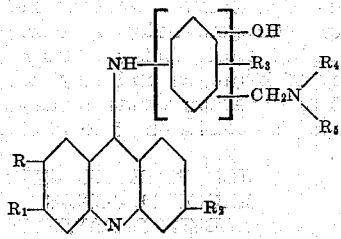

which comprises reacting a 9-substituted acridine compound of the formula,

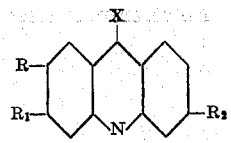

with a substituted aminophenol of the formula,

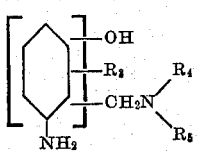

where X is a member of the class consisting of halogen and aryloxy radicals, R is a member of the class consisting of hydrogen, lower alkoxy and lower alkyl radicals, $R_1$ is a member of the class consisting of hydrogen, lower alkoxy and lower alkyl radicals, $R_2$ is a member of the class consisting of hydrogen, halogen and —CN, $R_3$ is a member of the class consisting of hydrogen, halogen, lower alkyl, and lower alkenyl radicals, $R_4$ is a member of the class consisting of hydrogen and alkyl radicals containing 5 to 10 carbon atoms inclusive, $R_5$ is an alkyl radical containing 5 to 10 carbon atoms inclusive, and the

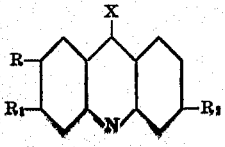

group is in one of the positions ortho and para to the —OH group.

9. Process for obtaining a compound of the class consisting of a free base and its acid addition salts, said free base having the formula,

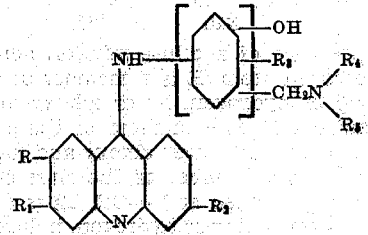

which comprises reacting a 9-haloacridine compound of the formula,

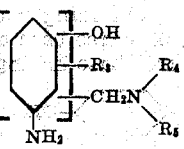

with a substituted aminophenol of the formula,

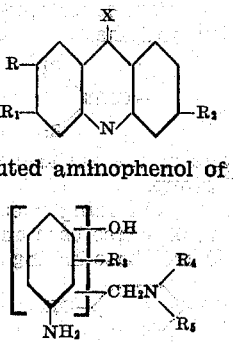

where X is a halogen atom, R is a member of the class consisting of hydrogen, lower alkoxy and lower alkyl radicals, $R_1$ is a member of the class consisting of hydrogen, lower alkoxy and lower alkyl radicals, $R_2$ is a member of the class consisting of hydrogen, halogen and —CN, $R_3$ is a member of the class consisting of hydrogen, halogen, lower alkyl, and lower alkenyl radicals, $R_4$ is a member of the class consisting of hydrogen and alkyl radicals containing 5 to 10 carbon atoms inclusive, $R_5$ is an alkyl radical containing 5 to 10 carbon atoms inclusive, and the

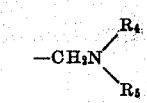

group is in one of the positions ortho and para to the —OH group.

10. Process for obtaining a compound of the class consisting of a free base and its acid addition salts, said free base having the formula,

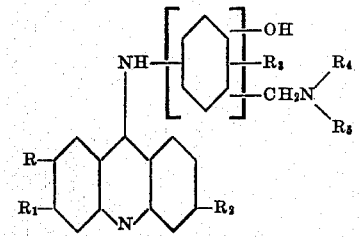

which comprises reacting a 9-haloacridine compound of the formula, with a substituted aminophenol of the formula,

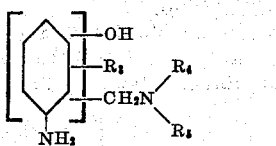

in the presence of a dilute mineral acid, where X is a halogen atom, R is a member of the class consisting of hydrogen, lower alkoxy and lower alkyl radicals, $R_1$ is a member of the class consisting of hydrogen, lower alkoxy and lower alkyl radicals, $R_2$ is a member of the class consisting of hydrogen, halogen and —CN, $R_3$ is a member of the class consisting of hydrogen, halogen, lower alkyl, and lower alkenyl radicals, $R_4$ is a member of the class consisting of hydrogen and alkyl radicals containing 5 to 10 carbon atoms inclusive, $R_5$ is an alkyl radical containing 5 to 10 carbon atoms inclusive, and the

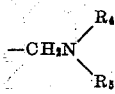

group is in one of the position ortho and para to the —OH group.

11. Process for obtaining a compound of the class consisting of a free base and its acid addition salts, said free base having the formula,

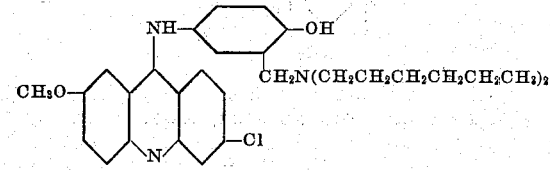

which comprises reacting 2 - methoxy - 6,9 - dichloroacridine with 2-di-n-hexylaminomethyl-4-aminophenol.

12. Process for obtaining a compound of the class consisting of a free base and its acid addition salts, said free base having the formula,

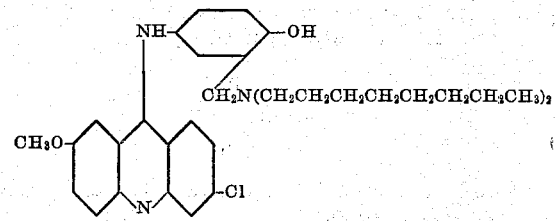

which comprises reacting 2 - methoxy - 6,9 - dichloroacridine with 2-di-n-octylaminomethyl-4-aminophenol.

13. Process for obtaining a compound of the class consisting of a free base and its acid addition salts, said free base having the formula,

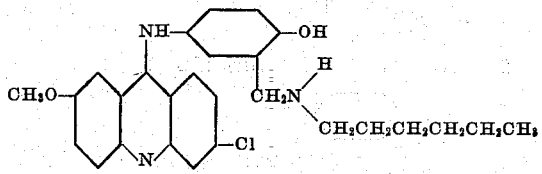

which comprises reacting 2 - methoxy - 6,9 - dichloroacridine with 2-n-hexylaminomethyl-4-aminophenol.

14. An acid addition salt of a free base, said free base having the formula,

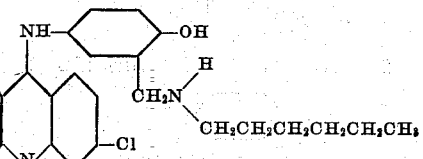

where R is a member of the class consisting of hydrogen, lower alkoxy and lower alkyl radicals, $R_1$ is a member of the class consisting of hydrogen, lower alkoxy and lower alkyl radicals, $R_2$ is a member of the class consisting of hydrogen, halogen and —CN, $R_3$ is a member of the class consisting of hydrogen, halogen, lower alkyl and lower alkenyl radicals, $R_4$ is a member of the class consisting of hydrogen and alkyl radicals containing 5 to 10 carbon atoms inclusive and $R_5$ is an alkyl radical containing 5 to 10 carbon atoms inclusive.

JOSEPH H. BURCKHALTER.
ELDON M. JONES.
ALBERT L. RAWLINS.
FRANK H. TENDICK.
WALTER F. HOLCOMB.

No references cited